Sept. 7, 1937.    W. R. KEPLER    2,092,165
SUPPORT FOR CYLINDRICAL VESSELS
Filed June 8, 1935    3 Sheets-Sheet 1

INVENTOR.
William R. Kepler
BY
ATTORNEY.

Sept. 7, 1937.    W. R. KEPLER    2,092,165
SUPPORT FOR CYLINDRICAL VESSELS
Filed June 8, 1935    3 Sheets—Sheet 2

INVENTOR.
William R. Kepler
BY
ATTORNEY.

Sept. 7, 1937.   W. R. KEPLER   2,092,165
SUPPORT FOR CYLINDRICAL VESSELS
Filed June 8, 1935   3 Sheets-Sheet 3

INVENTOR.
William R. Kepler
BY
ATTORNEY.

Patented Sept. 7, 1937

2,092,165

UNITED STATES PATENT OFFICE 2,092,165

SUPPORT FOR CYLINDRICAL VESSELS

William R. Kepler, Wauwatosa, Wis., assignor to A. O. Smith Corporation, Milwaukee, Wis., a corporation of New York Application June 8, 1935, Serial No. 25,585

4 Claims. (Cl. 248—146)

This invention relates to supports for vessels and more specifically to supports for vitreous enameled vessels of the horizontal cylindrical type.

An object of the invention is to provide a simple and effective means of supporting vessels of the type indicated.

Vessels used for the storage and aging of beer are often of relatively thin wall, but large diameter and length. Vitreous enamel in many instances is applied to the inside surface of such vessels to protect the beer against contact with the metal.

It is an object of this invention to provide supports attached to said vessel which not only are satisfactory for carrying the vessel and its contents after completion of the vessel, but also serve for supporting the vessel during the heating operation for the firing of the vitreous enamel lining.

It is a further object of the invention to provide a support for a vessel which, by welding to the vessel, will facilitate the firing of said vessel and enamel lining without injury to said enamel during heating or cooling.

Other objects of the invention will become apparent upon reference to the accompanying drawings and specification.

Figure 1:
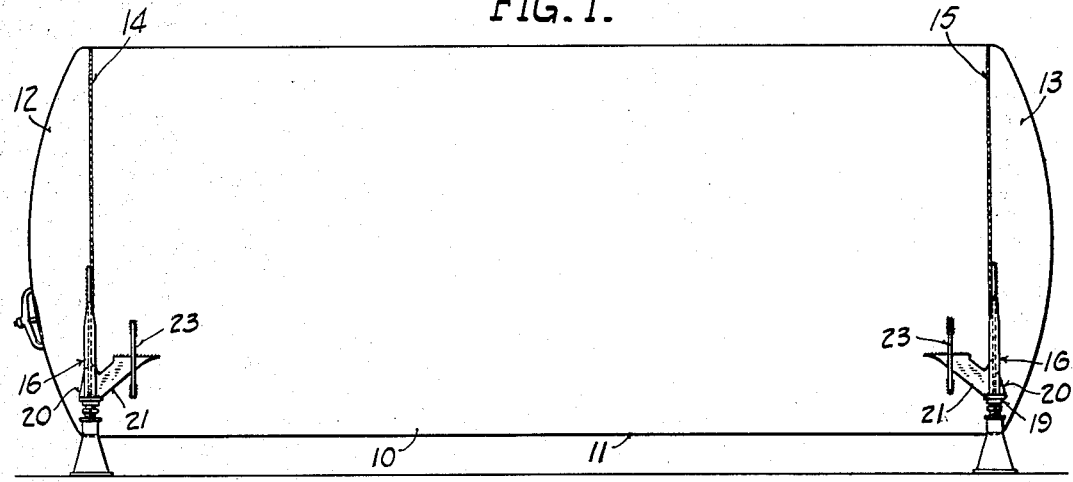
Figure 1 is a side elevational view of a storage vessel embodying the present invention.

It is important that in connection with vessels for liquid storage, and other purposes in which vitreous enamel liners are employed, that the metal of the vessel be deflected as little as possible and be strained substantially uniformly throughout the enameled regions. At least it is desirable that the strains in the vessel shall nowhere become excessive either during enameling or during use of the vessel subsequent to enameling. Excessive deflection or straining of the vessel in the region of the enamel may cause the latter to craze or flake off the vessel.

It has been found that, in supporting a vessel of the type above indicated, the least deflection of the vessel parts is obtained by supporting it on four supports, as illustrated in the drawings.

Referring to the drawings, 10 represents a horizontally disposed cylindrical vessel for the storage of liquids or other contents. Vessel 10 has a cylindrical shell portion 11, and closed end portions 12 and 13. Heads 12 and 13 are shown as dished heads butt welded to cylindrical portion 11 on lines 14 and 15 respectively.

Vessels of the type above illustrated are frequently of dimensions in excess of 11 feet in diameter and 40 feet in length with plate thicknesses as low as ¼ inch. The invention, however, applies as well to smaller vessels.

Figure 2:
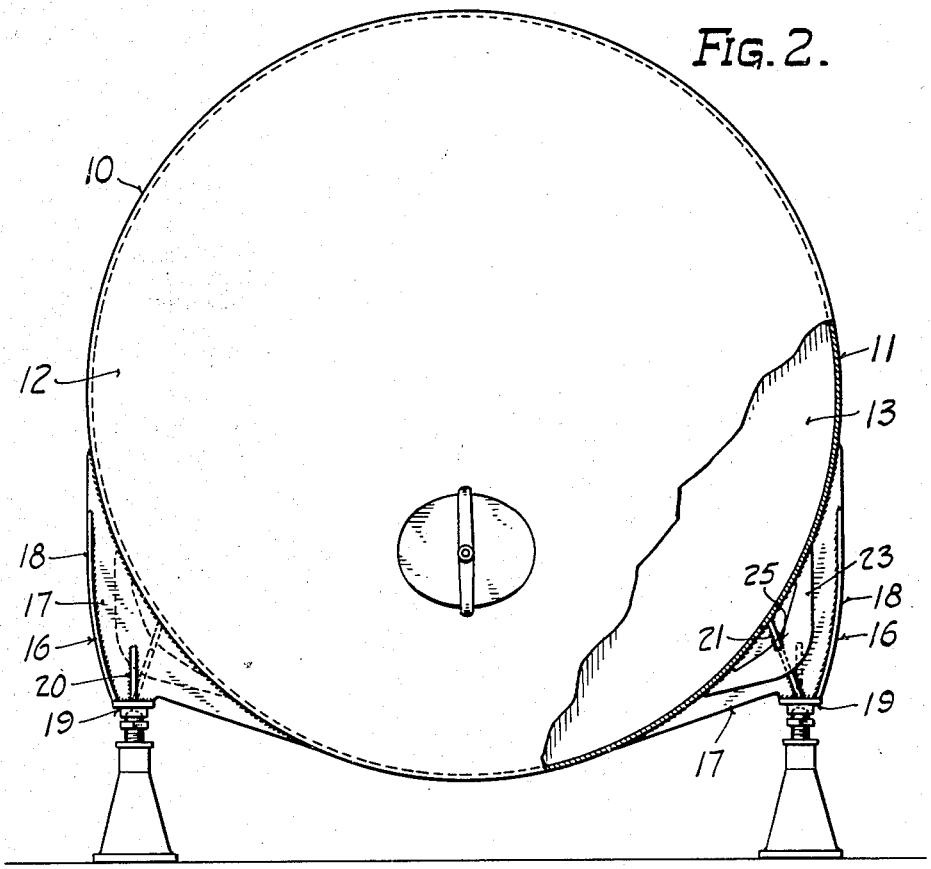
Fig. 2 is an enlarged end elevation of the vessel shown in Figure 1, a part being broken away.
Figure 3:
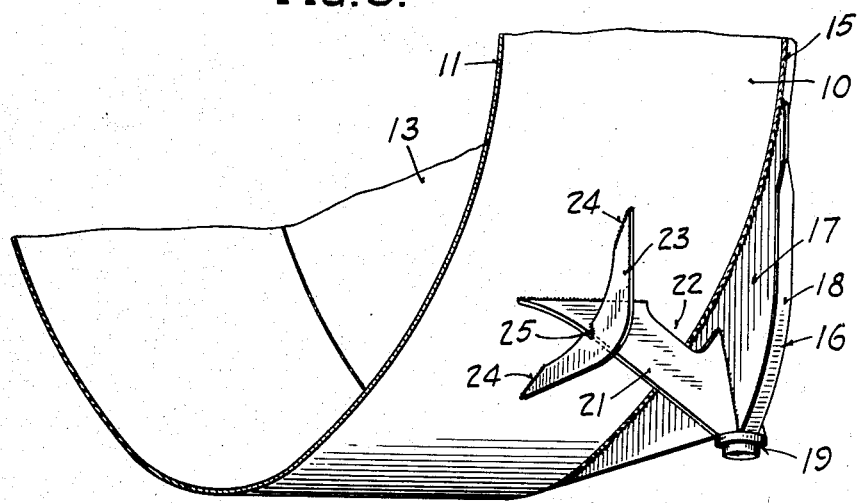
Fig. 3 is an enlarged perspective view of one of the vessel supports.

In Figs. 1 and 2, four vessel supports 16 are shown arranged two at each head. An enlarged view of one of these supports is shown in Fig. 3 in which 17 is a plate or fin edge-welded to the vessel head along the line of the so-called knee or knuckle of said head and positioned to support the vessel near the ends of the horizontal diameters of these lines of joinder between the head contour and the cylindrical portion of the vessel. A stiffening plate flange 18 is provided for said fin plate. A seat plate or block 19 is welded to fin 17 and flange 18, as shown. A brace 20 is welded between seat plate 19 and fin 17 (shown in Figs. 1 and 2). A relatively long plate 21 is extended between fin plate 17 and the vessel wall 11. This plate is edgewise welded to said vessel wall and is preferably substantially cut away adjacent to fin plate 17 as at 22. The welding of plate 21 to the vessel wall is thus along a longitudinal element of said shell, but at a position removed from the supporting fin plate 17 located at the knuckle position of the head.

A flat plate 23 is arranged circumferentially of said vessel and edgewise welded thereto and to the plate 21 remote from the supporting fin plate 17. It is preferable to cut away the central portion of the inner edge of plate 23 so that it is edgewise welded to the vessel circumference in lines removed from plate 21 as at points 24. Plate 23 is also welded to plate 21 at position 25.

A support is needed for these vessels which will not only support the vessels under load in use without damage to the vessel, but which is useable in supporting the vessel during its period of heating for the purpose of fusing the enamel during its manufacture.

Figure 6:
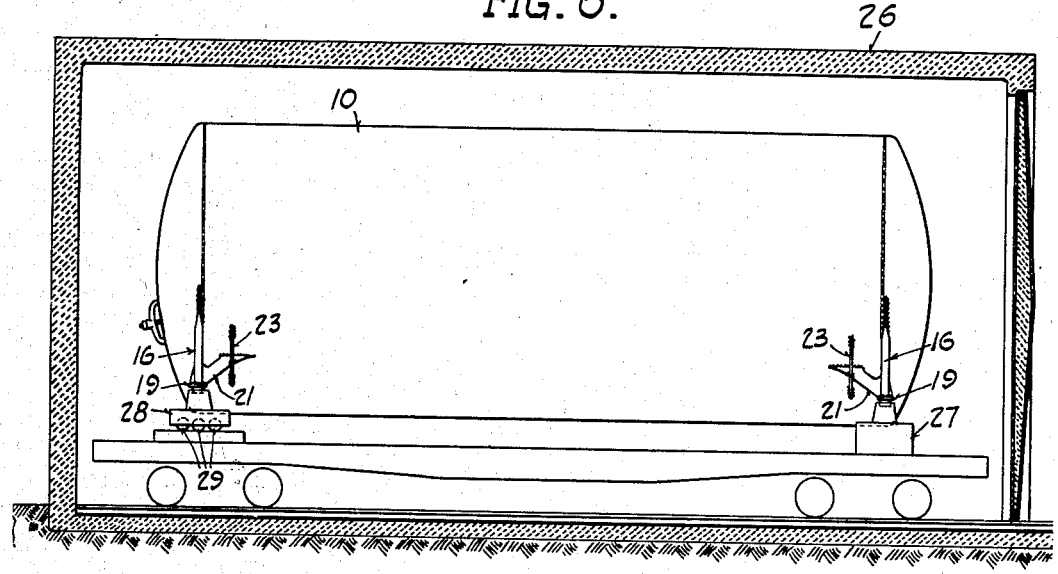
Fig. 6 is a side elevation of a vessel represented as mounted in a furnace for heating and fusing a vitreous enamel lining.

During this period of heating, the vessel is greatly softened at the high temperatures employed and is also subjected to great expansion and contraction movements, Fig. 6 illustrates a vessel 10 mounted on supports 16 in a furnace 26. The vessel supports at one end of the vessel rest on fixed members in the furnace as at 27, and at the other end on trucks 28 movable in the direction of expansion of the vessel. Said trucks are arranged to move on rollers 29.

Every precaution is taken to have these truck supports move with as little resistance as possible. However, appreciable force is nevertheless transmitted through the supports 16 to cause trucks 28 to move.

Figure 4:
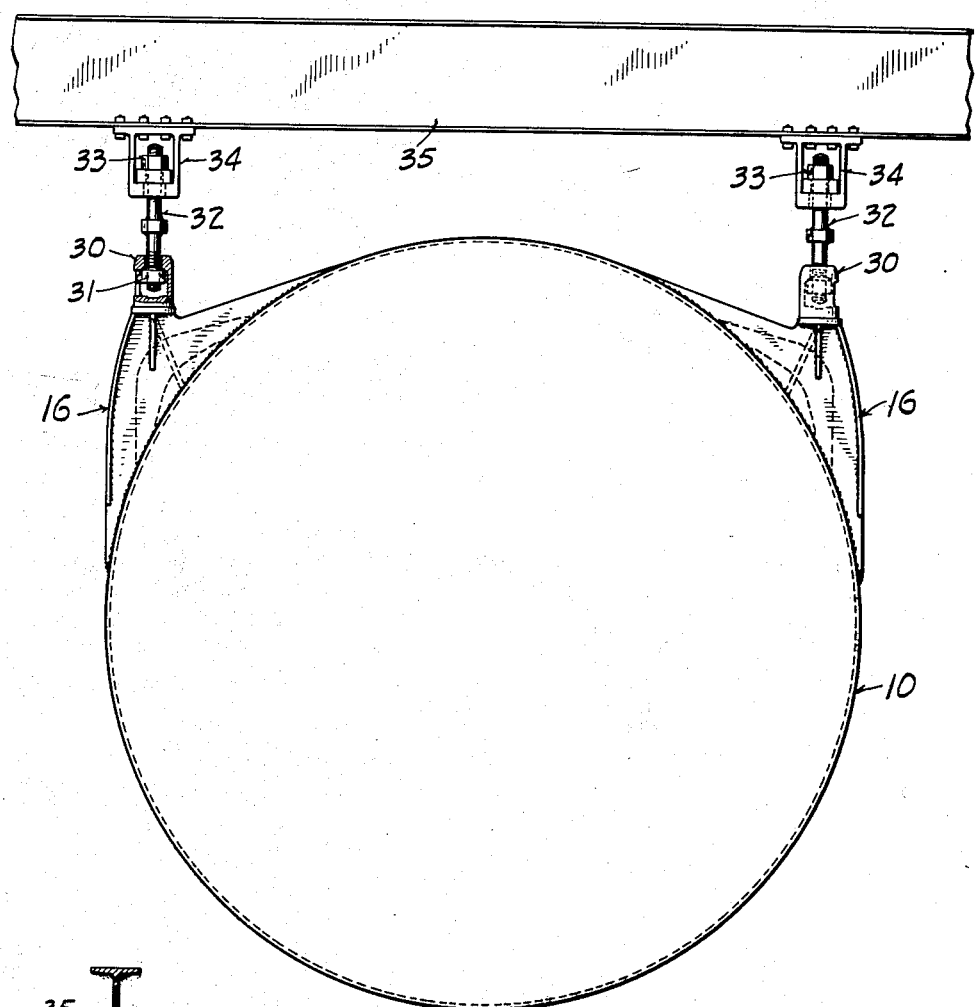
Fig. 4 is an end elevational view of a vessel in which the supports suspend the vessel.
Figure 5:
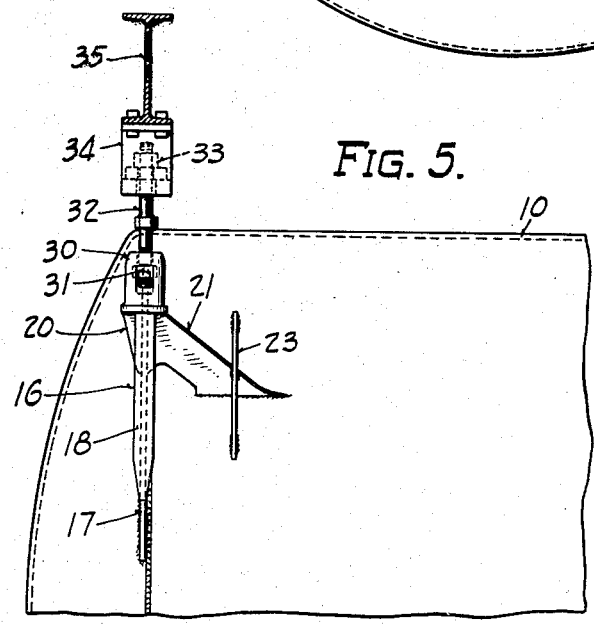
Fig. 5 is a side elevational view of one of the supports shown in Fig. 4.

Figs. 4 and 5 illustrate a vessel in which supports, similar to those above described, are employed to support the vessel by suspension. Like parts have been numbered with the same numerals as their corresponding parts in Figs. 1, 2 and 3. In the firing of the enamel for a vessel, such as that of Figs. 4 and 5, the heating and firing is preferably done in the position illustrated in Fig. 6. After the completion of this operation, a fitting 30, to receive a supporting nut 31, is welded to the support 16. In suspension, an adjusting rod 32 is then threaded into nut 31 and another nut 33, contained in bracket 34, attached to the supporting structure 35.

The structure of the supports and their members, as above explained, transmits necessary forces and heats up uniformly so that the enamel is uniformly fused and the vessel subjected to such minimum deflection or strain as not to injure the enamel upon cooling.

By welding the various members of the supports to the vessel wall in edgewise relation, and by employing members properly proportioned with respect to the thickness of the vessel wall, the heat for fusing the enamel is permitted to uniformly heat the vessel walls and thereby prevent differences in temperature due to heat conduction to or from said vessel by said attached plates. It is preferred to have the weld-attached plates of substantially the same or slightly greater thickness than the vessel wall to which they are attached.

The plate 21 supports fin 17 against bending by carrying a support back into the vessel wall. Plate 23 is attached to plate 21 and carries the force applied by it to a circumferential line of the vessel, and secures thereby an arch portion, by means of which fin 17 is supported against bending. By cutting away the inner center portion of plate 23 and attaching it to the vessel at points removed from said center, there is obtained a certain freedom between the edgewise attachments of plate 21 and those of plate 23 to the vessel wall. This entire structure functions as an efficient support and makes it possible to apply an enamel coat on the inside of the vessel and fire the same and subsequently cool the vessel with no injury to said enamel.

The supports, as above described, also adequately support the finished vessel in filled condition and protect it against injury either to itself or its applied lining of vitreous enamel.

It is to be understood that the embodiments of the invention disclosed in the drawings are illustrative and are not to be construed as limiting the invention as expressed in the appended claims.

I claim:

1. In combination with a horizontally positioned vitreous enameled cylindrical vessel, four supports positioned near the extremities of the horizontal diameter position of the junction between the vessel head contour and the cylindrical body contour, each support comprising a fin plate disposed in a vertical plane and arranged transversely to the axis of the vessel and edge-welded to said vessel at said junction, a plate joined at an angle to said fin plate and edge-welded to the wall of said vessel along a longitudinally spaced portion thereof, and a circumferentially disposed plate near the end of said second plate and secured thereto and edge-welded to said vessel wall in a circumferential line thereof.

2. In combination with a horizontally positioned thin-walled vitreous enameled vessel having a cylindrical body portion and head portions meeting said body portion at an angle in circumferential meeting lines, transverse supporting plates edge-welded to said vessel along said meeting lines and extending therealong from positions near the extremities of the horizontal diameters of said vessel, said plates having substantially the same thicknesses as the portions of the vessel to which they are joined.

3. In combination, a thin-walled horizontally disposed cylindrical vessel having head portions meeting the cylindrical body portion at an angle in circumferential meeting lines, fin-supporting plates attached to said vessel along said lines near the extremities of the horizontal diameters thereof, and means connecting said fin plates to said vessel walls laterally of said plates to prevent the buckling and/or bending of said plates, said plates and said means being attached to said vessel by edgewise welding.

4. In combination with a vitreous enamel-lined thin-walled vessel of horizontal cylindrical construction, flat supports for said vessel edgewise attached to said vessel at approximately the outer horizontal meeting points of the cylindrical portion of said vessel and the end closures thereof, members extending laterally of said flat supports and longitudinally of said cylindrical vessel portion, and circumferentially extending members attached to said second named members remote from said flat vessel supports and attached to said vessel walls on either side of and circumferentially removed from said second named members.

WILLIAM R. KEPLER.